(12) United States Patent
Mastroianni et al.

(10) Patent No.: US 12,017,634 B2
(45) Date of Patent: Jun. 25, 2024

(54) SYSTEMS AND METHODS FOR DISCONNECTING TANDEM AXLES

(71) Applicant: Dana Heavy Vehicle Systems Group, LLC, Maumee, OH (US)

(72) Inventors: Steven Mastroianni, Perrysburg, OH (US); Andrew T. Brammer, Toledo, OH (US); Jeremy M. Frenznick, Brighton, MI (US)

(73) Assignee: DANA HEAVY VEHICLE SYSTEMS GROUP, LLC, Maumee, OH (US)

( * ) Notice: Subject to any disclaimer, the term of this patent is extended or adjusted under 35 U.S.C. 154(b) by 0 days.

(21) Appl. No.: 18/310,424

(22) Filed: May 1, 2023

(65) Prior Publication Data

US 2023/0264673 A1    Aug. 24, 2023

Related U.S. Application Data

(63) Continuation of application No. 17/175,450, filed on Feb. 12, 2021, now Pat. No. 11,691,612.

(51) Int. Cl.
*B60W 10/08* (2006.01)
*B60K 17/35* (2006.01)
*B60W 10/06* (2006.01)

(52) U.S. Cl.
CPC ......... *B60W 10/08* (2013.01); *B60K 17/3515* (2013.01); *B60W 10/06* (2013.01); *B60W 2510/087* (2013.01); *B60W 2710/0666* (2013.01); *B60W 2710/083* (2013.01)

(58) Field of Classification Search
CPC ... B60W 2710/0666; B60W 2710/083; B60W 10/08; B60W 10/06
See application file for complete search history.

(56) References Cited

U.S. PATENT DOCUMENTS

| | | |
|---|---|---|
| 6,085,138 A | 7/2000 | Smith et al. |
| 6,336,069 B1 | 1/2002 | Hasegawa et al. |
| 8,312,956 B2 | 11/2012 | Rindfleisch |
| 8,398,520 B1 | 3/2013 | Bassi et al. |
| 9,162,569 B2 | 10/2015 | Dean |
| 9,579,975 B2 | 2/2017 | Ekonen et al. |
| 9,821,780 B2 | 11/2017 | Korson et al. |
| 9,994,249 B2 | 6/2018 | Kageyama et al. |
| 10,384,537 B2 | 8/2019 | Flogard et al. |
| 2009/0166106 A1 | 7/2009 | Batdorf |
| 2010/0248888 A1 | 9/2010 | Hamperl et al. |
| 2011/0098151 A1* | 4/2011 | Ziemer ................. B60K 6/485 180/65.265 |

(Continued)

FOREIGN PATENT DOCUMENTS

GB          2530877 A      6/2016
WO      2013141893 A1     9/2013

*Primary Examiner* — George C Jin
(74) *Attorney, Agent, or Firm* — McCoy Russell LLP (57) ABSTRACT

Methods and systems are provided for controlling a multi-axle assembly in a vehicle. The multi-axle assembly may be operated according to a requested mode, where the mode includes providing torque at one, two, or no axles of the multi-axle assembly, and the requested mode may be selected based on vehicle speed. In this way, operation of the multi-axle assembly may be adjusted according to a fuel efficiency of the vehicle while the vehicle is in motion.

20 Claims, 5 Drawing Sheets

(56) References Cited

U.S. PATENT DOCUMENTS

| | | |
|---|---|---|
| 2013/0240279 A1 | 9/2013 | Casey et al. |
| 2014/0257617 A1* | 9/2014 | Klymenko .............. B60L 15/20 |
| | | 701/22 |
| 2015/0266375 A1 | 9/2015 | Tavvala et al. |
| 2018/0093655 A1 | 4/2018 | Healy et al. |
| 2018/0345952 A1 | 12/2018 | Layfield et al. |
| 2019/0047542 A1 | 2/2019 | Siuchta |
| 2019/0232783 A1 | 8/2019 | Siuchta et al. |
| 2019/0331173 A1 | 10/2019 | Eschenburg et al. |
| 2020/0047613 A1 | 2/2020 | Eschenburg et al. |
| 2020/0164743 A1 | 5/2020 | Frenznick et al. |
| 2022/0145841 A1 | 5/2022 | Nießing |
| 2022/0258604 A1 | 8/2022 | Mastroianni et al. |
| 2022/0324320 A1 | 10/2022 | Badino |

\* cited by examiner

SYSTEMS AND METHODS FOR DISCONNECTING TANDEM AXLES

CROSS REFERENCE TO RELATED APPLICATION

The present application is a continuation of U.S. Non-Provisional patent application Ser. No. 17/175,450, entitled "SYSTEMS AND METHODS FOR DISCONNECTING TANDEM AXLES", and filed on Feb. 12, 2021. The entire contents of the above-listed application are hereby incorporated by reference for all purposes.

TECHNICAL FIELD

The present disclosure relates to methods of controlling a multi-axle assembly in a multi-axle vehicle.

BACKGROUND AND SUMMARY

Vehicles having multiple drive axle assemblies may be configured to distribute torque either proportionally or disproportionally between the axles. A device, such as an inter-axle differential (IAD) connected to an IAD lock is commonly used in such vehicles to split the torque between the axles by locking or unlocking the IAD lock.

Various mechanisms can be used in these vehicles to allow a user to transition from single axle operation to multiple axle operation by engaging and disengaging one or more of the drive axles. Conventional mechanisms for connecting and disconnecting drive axles occur through the axle shaft. Some of these mechanisms require an axle or coupling mechanism to be moved in and out of place in order to disconnect the axle and transition between different driving modes. These mechanisms are costly, time-consuming, and cumbersome.

Other mechanisms allow a user to selectively split the torque between the axles, without manually moving an axle, by disconnecting an axle shaft while the IAD remains locked. However, these mechanisms maintain an extra load on the engine since the wheels will continue to spin the front axle, the differential, and the driveshaft. The extra load results in increased mechanical resistance on the drivetrain and fuel inefficiency to the vehicle.

Therefore, it would be advantageous to develop a method of controlling a tandem axle assembly in a vehicle that is fuel-efficient and responsive to the speed of the vehicle. It would also be advantageous to develop a method of controlling a multi-axle assembly in a vehicle without requiring the user to stop the vehicle.

In one embodiment, the issues described above may be addressed by a method, comprising operating the multi-axle assembly according to a requested mode of a plurality of modes, wherein the plurality of modes includes providing torque at one, two or no axles of the multi-axle assembly based on a speed of the vehicle. In this way, a fuel economy of the vehicle may at least be maintained.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

The above, as well as other advantages of the present disclosure, will become readily apparent to those skilled in the art from the following detailed description when considered in light of the accompanying drawings in which.

DETAILED DESCRIPTION

Figure 1:
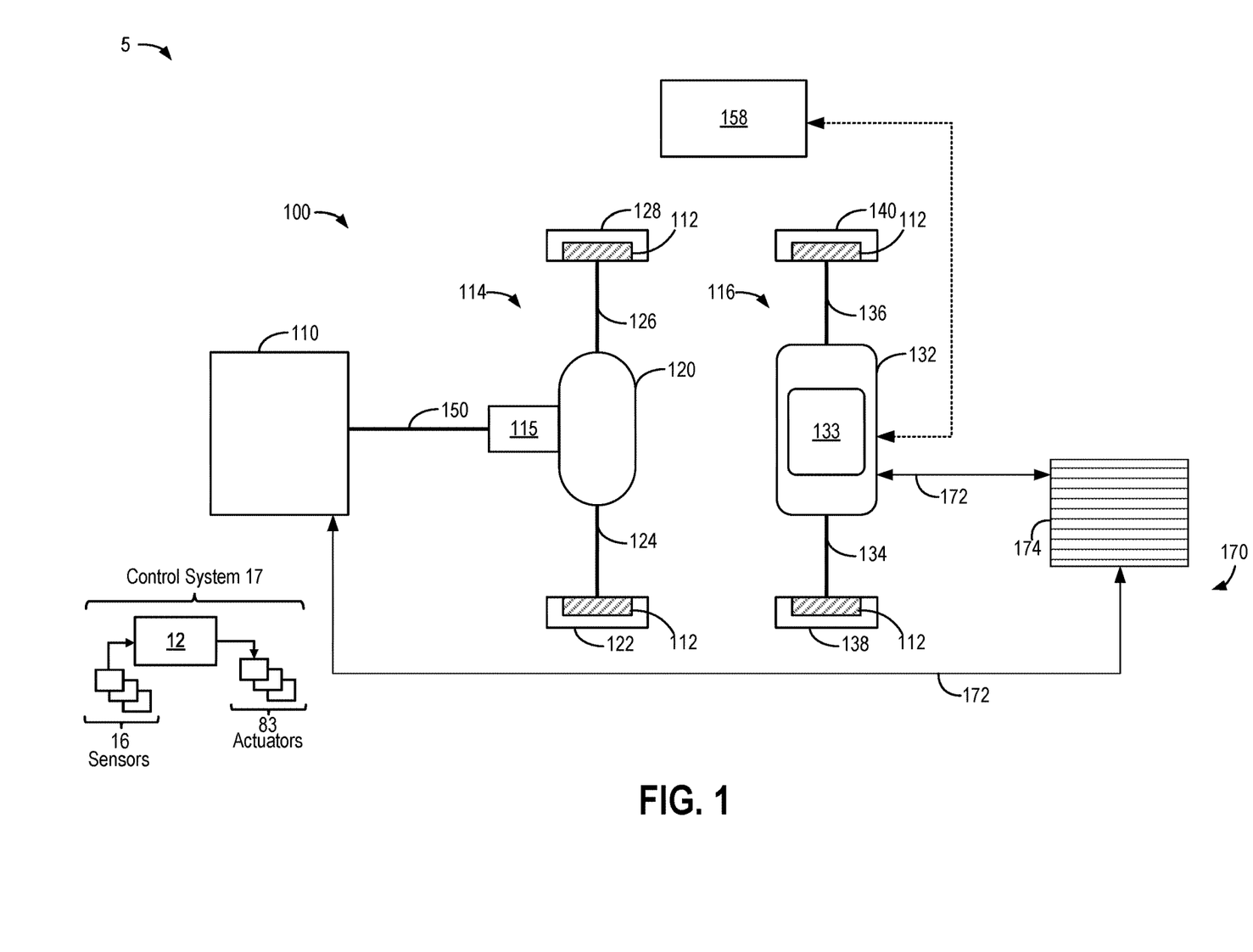
FIG. 1 is a schematic top-plan view of a first example of a tandem axle assembly having at least one electric axle, according to an embodiment of the disclosure.
Figure 2:
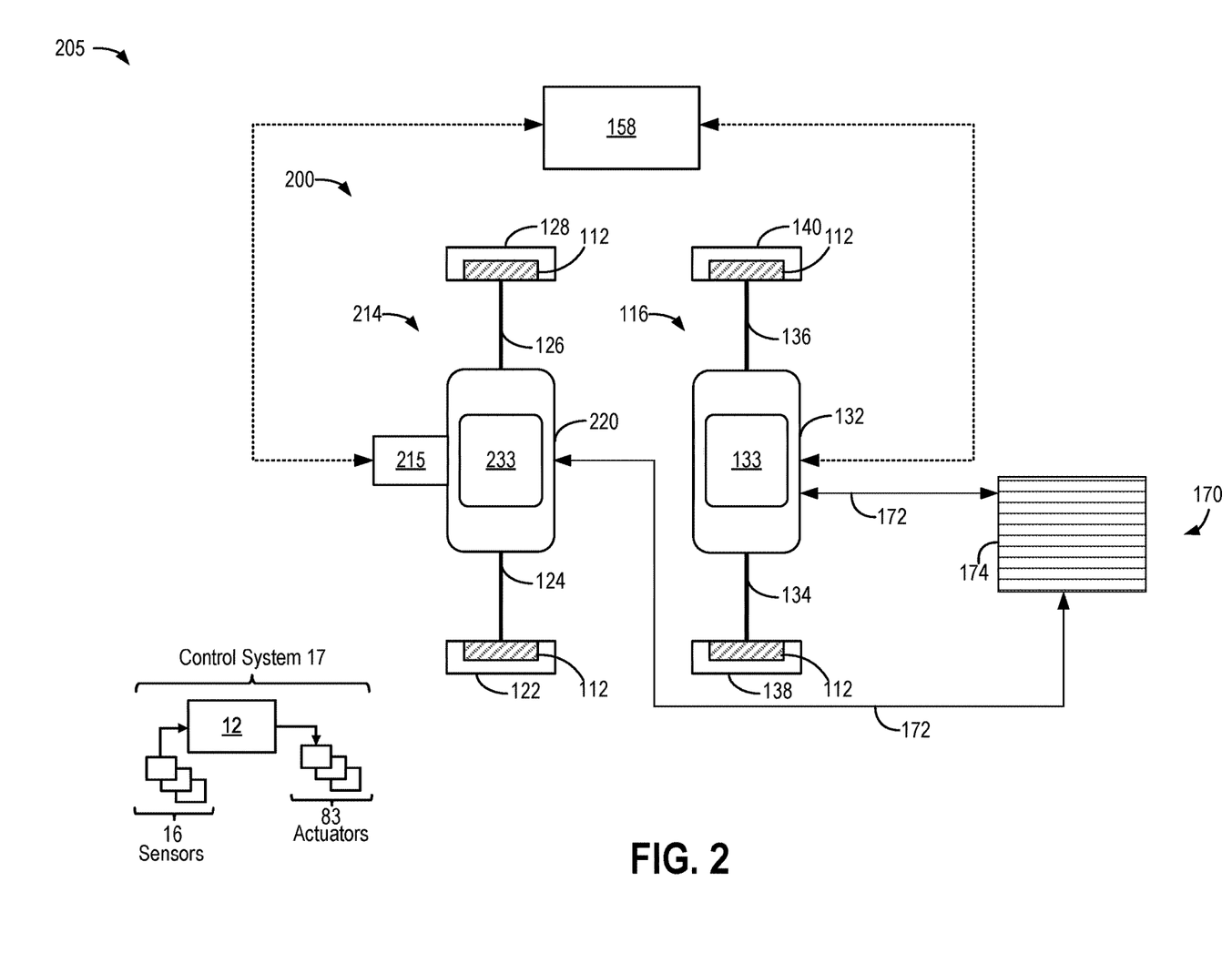
FIG. 2 is a schematic top-plan view of a second example of a tandem axle assembly having at least one electric axle, according to an embodiment of the disclosure.
Figure 3:
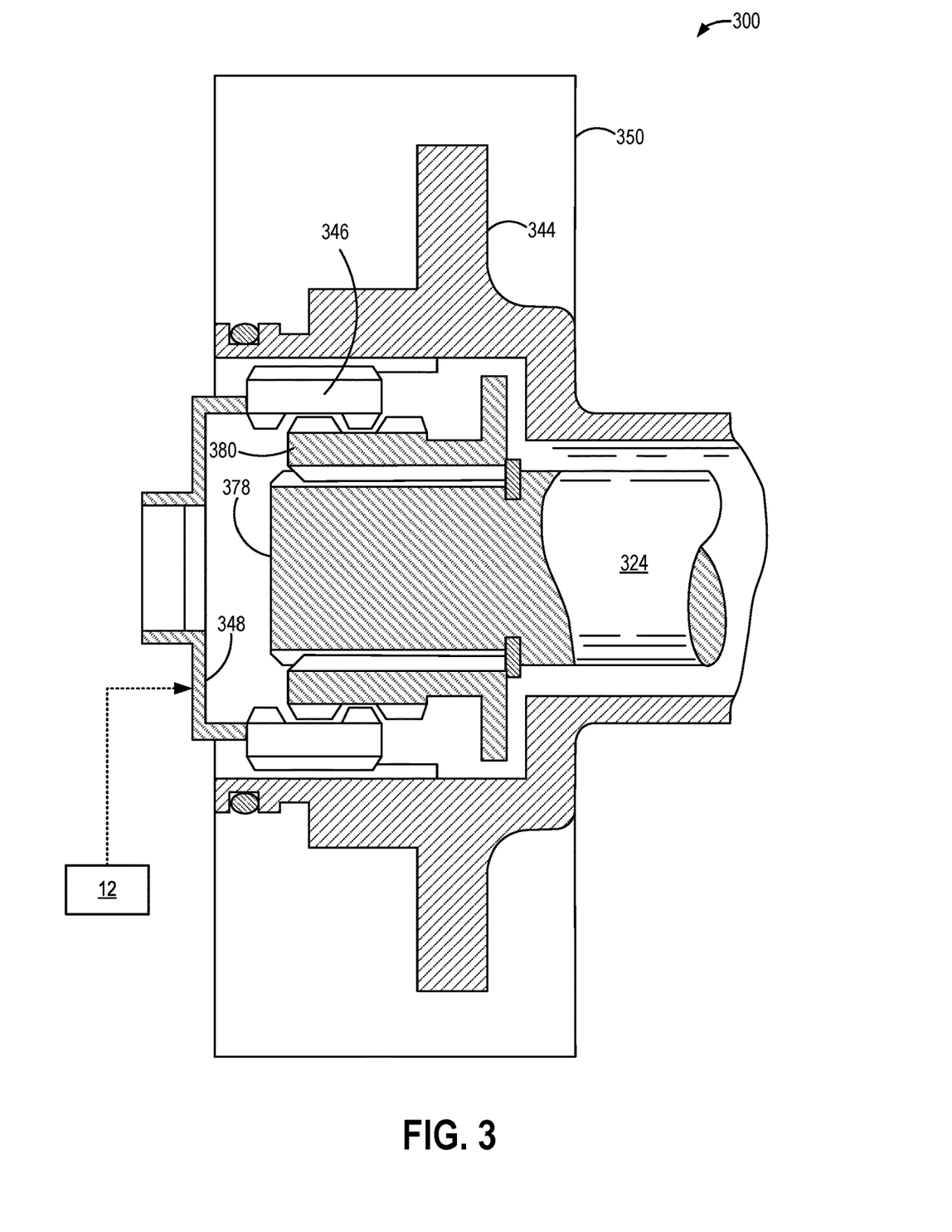
FIG. 3 is a schematic cut-away side view of a wheel locking system according to the embodiments illustrated in FIGS. 1 and 2, according to an embodiment of the disclosure.
Figure 4:
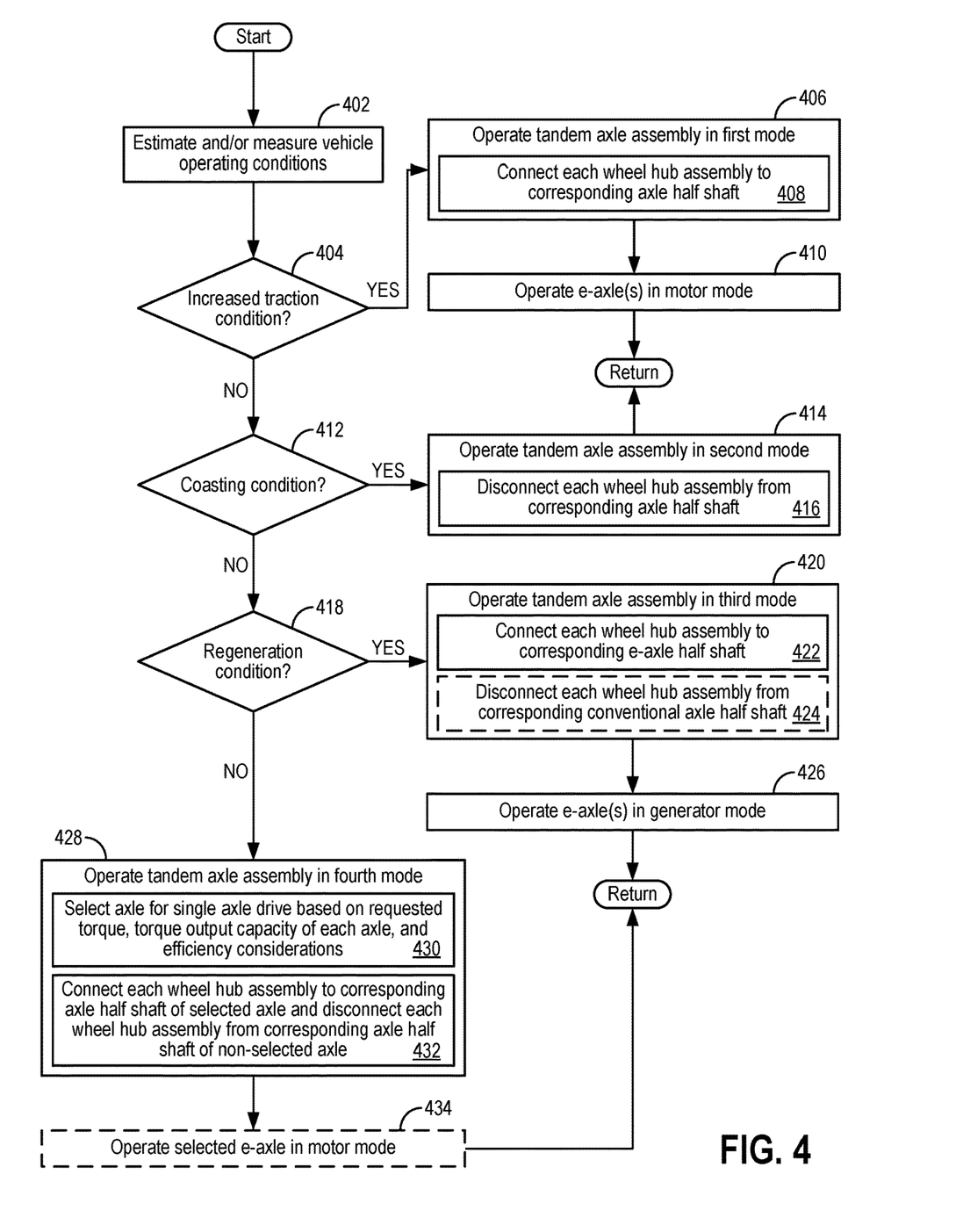
FIG. 4 is a flow chart depicting a process implementable in the tandem axle control assemblies illustrated in FIGS. 1 and 2, according to an embodiment of the disclosure.
Figure 5:
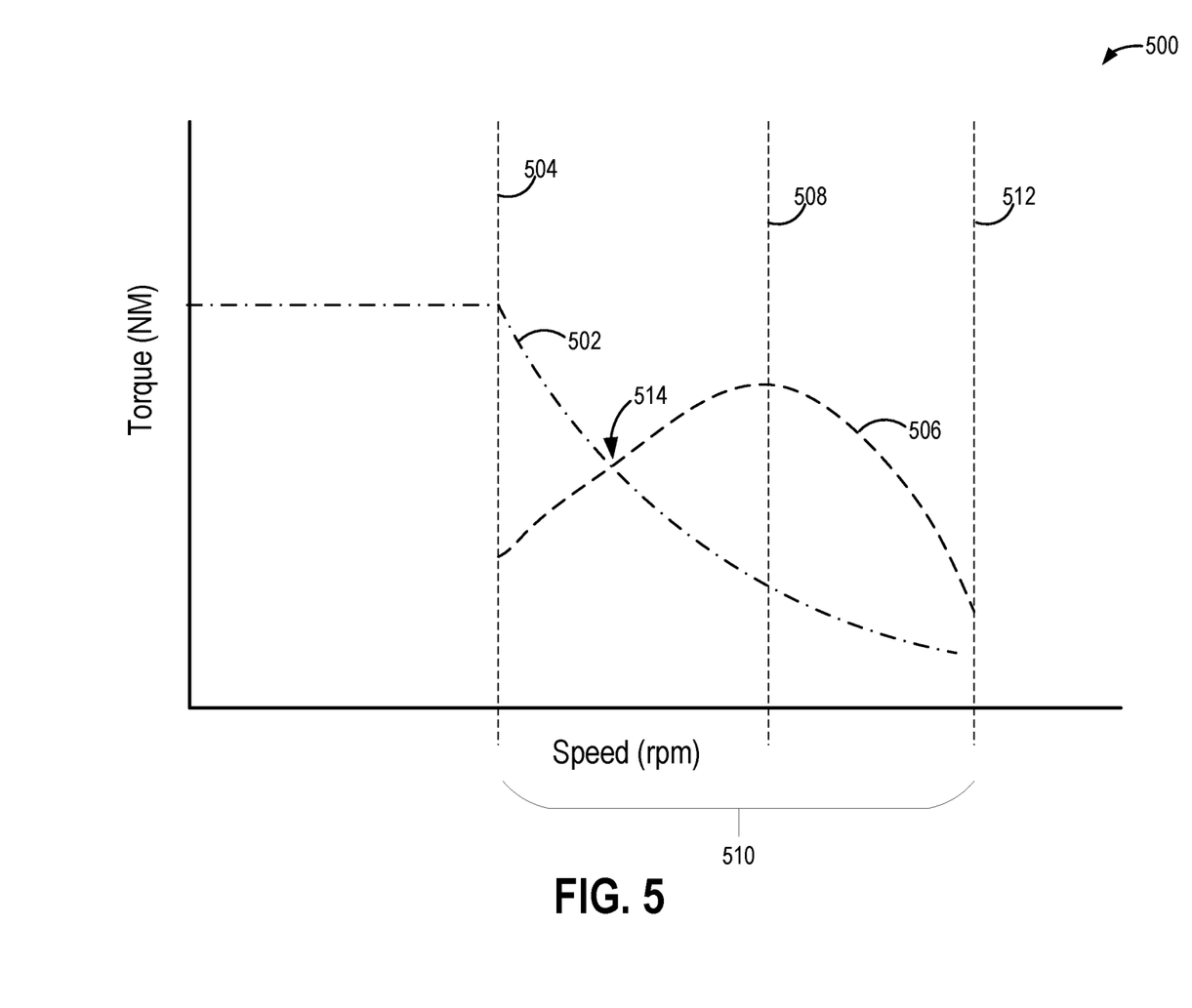
FIG. 5 is an example of a graph depicting torque output relative to speed of a device configured to drive rotation of an axle of the tandem axle assembly, according to an embodiment of the disclosure.

The following description relates to systems and methods for controlling a multi-axle assembly in a multi-axle vehicle. In one example, the multi-axle assembly may be a tandem axle assembly. The tandem axle assembly may include two axles, arranged parallel to and adjacent with one another, where rotation of each axle is enabled by a torque-generating device. For example, as shown in FIG. 1, the tandem axle assembly may include a conventionally powered axle, e.g., driven by a vehicle prime mover, and an electrical axle (e-axle) powered by an electric machine, as shown in FIG. 1 or alternatively, each axle of the tandem axle assembly may be an e-axle, as shown in FIG. 2. Wheels may be coupled to axles of the tandem axle assembly by a wheel locking system, including wheel hub assemblies configured to connect/disconnect the wheels from the axles while the vehicle is in motion. An example of the wheel locking system is depicted in FIG. 3. Adjustment of the tandem axle assembly, such as varying torque supply from one axle, two axles, or neither of the axles, may be implemented by a method, as shown in FIG. 4, for operating the tandem axle assembly according to a desired mode. Operation of the tandem axle assembly may be further determined based on a dependency of torque output at torque-generating devices (such as an engine or an electric machine), on device speed. A graph illustrating the relationships is depicted in FIG. 5.

Turning now to the figures, FIG. 1 shows a schematic top-plan view of a tandem axle assembly 100 according to an embodiment of the disclosure. The tandem axle assembly 100 may be included in a vehicle 5, which may be a passenger vehicle, an electric vehicle, a hybrid vehicle, a commercial vehicle, an autonomous vehicle, a semi-autonomous vehicle, and/or a heavy vehicle, for example. Further, the vehicle 5 may be used in automotive, off-road vehicle, all-terrain vehicle, construction, structural, marine, aerospace, locomotive, military, and/or agriculture applications, for example.

The tandem axle assembly 100 includes a front tandem axle assembly 114 and a rear tandem axle assembly 116. In the example shown, the front tandem axle assembly 114 is a conventional axle that receives rotational power through an input shaft 150 that is rotated by an engine (or other prime mover) 110. The engine is coupled to a transmission or gear box 115 which adjusts an application of power to the front tandem axle assembly 114. The rear tandem axle assembly 116 includes an electric axle (e.g., e-axle) 132 that is driven by an electric machine 133 and not by engine 110. The electric machine 133 may be a motor and/or a motor/generator, as will be elaborated below. However, in other examples, the front tandem axle assembly 114 may be an e-axle driven by an electric machine, and the rear tandem axle assembly 116 may be a conventional axle driven by engine 110. The rear tandem axle assembly 116 may also include the transmission 115 instead of or in addition to the front tandem axle assembly 114. An example of a tandem axle assembly including two e-axles will be described below with respect to FIG. 2.

The input shaft 150 is connected to a front tandem axle differential 120. In some embodiments, the front tandem axle differential 120 includes a traditional bevel differential gear set implemented to transmit rotational power to the front tandem axle assembly 114. The front tandem axle assembly 114 further includes a first front tandem axle half shaft 124 and a second front tandem axle half shaft 126. One end of the first front tandem axle half shaft 124 is drivingly connected to a first front tandem axle wheel hub assembly 122, and the other end of the first front tandem axle half shaft 124 is drivingly connected to the front tandem axle differential 120. One end of the second front tandem axle half shaft 126 is drivingly connected to a second front tandem axle wheel hub assembly 128, and the other end of the second front tandem axle half shaft 126 is drivingly connected to an end of front tandem axle differential 120.

The rear tandem axle assembly 116 further includes a first rear tandem axle half shaft 134 and a second rear tandem axle half shaft 136. One end of the first rear tandem axle half shaft 134 is drivingly connected to a first rear tandem axle wheel hub assembly 138, and the other end of the first rear tandem axle half shaft 134 is drivingly connected to the e-axle 132. One end of the second rear tandem axle half shaft 136 is drivingly connected to a second rear tandem axle wheel hub assembly 140, and the other end of the second rear tandem axle half shaft 136 is drivingly connected to the e-axle 132. The e-axle 132 may be a fully contained unit comprising the electric machine 133 and additional components, such as bearings, shafts, pinions, differential gearing, etc., within a lightweight, high-strength metal casing, such as an aluminum casing. In some examples, the e-axle 132 may include a single gear ratio, while in other examples, the e-axle 132 may include multiple gear ratios. The electric machine 133 may be a motor or a motor/generator and thus may also be referred to herein as an electric motor. The electric machine 133 receives electrical power from a traction battery 158 to provide torque to vehicle wheels coupled to the first rear tandem axle wheel hub assembly 138 and the second rear tandem axle wheel hub assembly 140. The electric machine 133 may also be operated as a generator to provide electrical power to charge the battery 158, for example, during a braking operation.

In some embodiments, each of the first front tandem axle wheel hub assembly 122, the second front tandem axle wheel hub assembly 128, the first rear tandem axle wheel hub assembly 138, and the second rear tandem axle wheel hub assembly 140 is a locking wheel hub assembly. Further, in the example shown, each of the first front tandem axle wheel hub assembly 122, the second front tandem axle wheel hub assembly 128, the first rear tandem axle wheel hub assembly 138, and the second rear tandem axle wheel hub assembly 140 includes a wheel end disconnect 112.

Each wheel end disconnect 112 enables the corresponding wheel hub assembly to be selectively disconnected from the corresponding axle. As a result, torque is not transferred between the wheel hub assembly and corresponding half shaft. An example embodiment of the wheel end disconnect 112 will be described below with respect to FIG. 3.

The vehicle 5 may be controlled at least partially by a control system 17, including a controller (e.g., control unit) 12, and by input from a vehicle operator. The control system 17 is shown receiving information from a plurality of sensors 16 (various examples of which are described herein) and sending control signals to a plurality of actuators 83. As one example, the sensors 16 may include speed sensors, torque load sensors, and/or temperature sensors. For example, one or more sensors 16 may be positioned on the first front tandem axle half shaft 124, the second front tandem axle half shaft 126, the first rear tandem axle half shaft 134, and/or the second rear tandem axle half shaft 136. As another example, actuators 83 may include each wheel end disconnect 112 and the electric machine 133. The controller 12 may receive input data from the various sensors, process the input data, and trigger the actuators in response to the processed input data based on instruction or code programmed in a memory of the controller 12 corresponding to one or more routines. For example, the controller may selectively actuate one or more of the wheel end disconnects 112 to decouple the corresponding axle (or a portion of the axle) from a road speed of the vehicle 5, such as during coasting. The controller 12 may be a microcomputer, including a microprocessor unit, input/output ports, an electronic storage medium for executable programs and calibration values (e.g., a read-only memory, or ROM), a random access memory (RAM), a keep alive memory (KAM), and a data bus. The storage medium read-only memory can be programmed with computer readable data representing instructions executable by the microprocessor for performing the methods and routines described herein as well as other variants that are anticipated but not specifically listed.

As used herein, the terms "control unit" or "controller" indicate electronic hardware as well as software stored on a one or more non-transitory computer readable storage media and executable by a processor. In some embodiments, a non-transitory computer readable storage medium (e.g., ROM) includes, by way of non-limiting examples CD-ROMs, DVDs, flash memory devices, solid state memory, magnetic disk drives, optical disk drives, cloud computing systems and services, and the like.

Further, it may be understood that the methods described in connection with the embodiments disclosed herein, including with reference to the control system described herein, can be implemented as electronic hardware, software stored on a computer readable medium and executable by a processor, or combinations of both. For example, various illustrative logical blocks, modules, and circuits described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration. Software associated with such modules can reside in RAM memory, flash memory, ROM memory, EPROM memory, EEPROM memory, registers, a hard disk, a removable disk, a CD-ROM, or any other suitable form of storage medium known in the art. An exemplary storage medium is coupled to the processor such the processor reads information from, and write information to, the storage medium. In the alternative, the storage medium can be integral to the processor. The processor and the storage medium can reside in an ASIC. For examples, in some embodiment, a control unit or controller for use of control of the tandem axle assembly includes a processor.

Continuing to FIG. 2, a schematic top-plan view of a tandem axle assembly 200 is shown, according to an embodiment of the disclosure. The tandem axle assembly 200 may be included in a vehicle 205, which may be a passenger vehicle, an electric vehicle, a hybrid vehicle, a commercial vehicle, an autonomous vehicle, a semi-autonomous vehicle, and/or a heavy vehicle, for example. Further, the vehicle 205 may be used in automotive, off-road vehicle, all-terrain vehicle, construction, structural, marine, aerospace, locomotive, military, and/or agriculture applications, for example. The tandem axle assembly 200 is similar to the tandem axle assembly 100 described above, except for the differences noted below. Thus, components of the tandem axle assembly 200 that function the same as those in the tandem axle assembly 100 are numbered the same and will not be reintroduced.

The tandem axle assembly 200 includes a front tandem axle assembly 214 and the rear tandem axle assembly 116. In the example shown, the front tandem axle assembly 214 and the rear tandem axle assembly 116 both include electric axles. For example, the front tandem axle assembly 214 includes an electric axle (e.g., e-axle) 220 that is driven by an electric machine 233. The front tandem axle assembly 214 may include a transmission 215 for adjusting power applied to the e-axle 220 from the electric machine 233. Similar to the electric machine 133 of e-axle 132, the electric machine 233 may be a motor and/or a motor/generator. The front tandem axle assembly 214 further includes the first front tandem axle half shaft 124 and the second front tandem axle half shaft 126. One end of the first front tandem axle half shaft 124 is drivingly connected to the first front tandem axle wheel hub assembly 122, and the other end of the first front tandem axle half shaft 124 is drivingly connected to the e-axle 220. One end of the second front tandem axle half shaft 126 is drivingly connected to the second front tandem axle wheel hub assembly 128, and the other end of the second front tandem axle half shaft 126 is drivingly connected to the e-axle 220. The e-axle 220 may be a fully contained unit comprising the electric machine 233 and the transmission 215 and additional components, such as bearings, shafts, pinions, differential gearing, etc., within a lightweight, high-strength metal casing, such as an aluminum casing. In some examples, the e-axle 220 may include a single gear ratio, while in other examples, the e-axle 220 may include multiple gear ratios. The electric machine 233 receives electrical power from the traction battery 158 to provide torque to vehicle wheels coupled to the first front tandem axle wheel hub assembly 122 and the second front tandem axle wheel hub assembly 128. The electric machine 233 may also be operated as a generator to provide electrical power to charge the battery 158, for example, during a braking operation.

Note that while the example shown in FIG. 2 includes one traction battery 158, in other examples, each axle assembly may include a separate battery. For example, the front tandem axle assembly 214 may receive energy from and transfer energy to a first traction battery, and the rear tandem axle assembly 116 may receive energy from and transfer energy to a second traction battery. Furthermore, while the transmission 215 is depicted at the front tandem axle assembly 214, the transmission 215 may also be included at the rear tandem axle assembly 116.

Similar to the vehicle 5 of FIG. 1, the vehicle 205 of FIG. 2 may be controlled at least partially by the control system 17, including the controller 12, and by input from a vehicle operator. The control system 17 is shown receiving information from the plurality of sensors 16 and sending control signals to the plurality of actuators 83 based on the information received from the plurality of sensors 16 and instructions stored in the memory of the controller 12, such as described above with respect to FIG. 1.

In addition, a temperature of each electric machine of FIGS. 1 and 2 (e.g., 133 and 233) may be controlled by a cooling system 170, as shown in FIGS. 1 and 2. As the electric machine operates, heat may be generated due to losses at various regions of the electric machine, including stator windings, stator and rotor laminations, rotor magnets, etc. Heating of the electric machine may reduce torque output, motor control and efficiency. Thus, active cooling of the electric machine during operation may be demanded to maintain its performance. The electric machine may be cooled via the cooling system 170 of the vehicle, where the cooling system 170 includes a circuit flowing a coolant such as water from a heat exchange device to various coolant passages 172 to direct the coolant to heat-generating regions. It will be appreciated that a single coolant passage 172 is depicted between a heat exchanger 174 of the cooling system 170 and each of the target heat-generating regions for brevity and more than one coolant passage 172 may be coupled to each of the target regions.

For example, in the first example of the tandem axle assembly 100 of FIG. 1, the engine 110 may be configured with a water jacket coupled to the cooling system 170 to reduce a temperature of the engine 110 during engine operation. The coolant passages 172 may deliver coolant to the electric machine 133 when the electric machine 133 is activated. Flow of coolant may be directed exclusively to the engine 110 when the electric machine 133 is not active or may be constantly circulated to the electric machine 133 regardless of operating status. As such, the heat exchanger 174 of the cooling system 170, e.g., a radiator, may be configured to accommodate cooling of both the engine 110 and the electric machine 133 by increasing a size of the heat exchanger 174 or by flowing coolant with a greater heat capacity than, for example, water. Furthermore, a direction of coolant may be arranged such that the engine 110 is upstream of the electric machine 133 or downstream of the electric machine 133 depending on which of the engine 110 and the electric machine 133 is anticipated to demand a greater degree of cooling.

As another example, when the tandem axle assembly is configured as the second example of the tandem axle assembly 200 of FIG. 2, each of the electric machines 133, 233 may be cooled by the cooling system 170. The cooling system 170 may distribute coolant equally to each of the electric machines or may preferentially direct coolant to one of the electric machines when a temperature at one of the electric machines increases above a threshold temperature or when only one of the electric machines is active. Coolant delivery may therefore vary according to demand. For example, when both electric machines are operating, coolant flow may be distributed equally between the electric machines until one of the electric machines reaches the threshold temperature. Coolant flow may be biased to increase delivery to the hotter electric machine until the temperature is reduced to below the threshold temperature.

As another example, in some instances, both electric machines may be operating and heat generation may cause temperatures at both electric machines to reach the threshold temperature. In response, one of the electric machines may be deactivated to allow the coolant flow to provide maximum cooling to the other, still active electric machine. When the temperature of the active electric machine is cooled to below the threshold temperature, operation of the deactivated electric machine may resume and the active electric machine may either be maintained active or deactivated.

Referring now to FIG. 3, a schematic cut-away side view of a tandem axle half shaft 324 connected to a tandem axle wheel hub assembly 300 is shown. For example, the tandem axle wheel hub assembly 300 may be any of the first front tandem axle wheel hub assembly 122, the second front tandem axle wheel hub assembly 128, the first rear tandem axle wheel hub assembly 138, and the second rear tandem axle wheel hub assembly 140 shown in FIGS. 1 and 2, and thus, the tandem axle half shaft 324 may represent any of the first front tandem axle half shaft 124, the second front tandem axle half shaft 126, the first rear tandem axle half shaft 134, and the second rear tandem axle half shaft 136 of FIGS. 1 and 2. The tandem axle wheel hub assembly 300 includes one or more wheels 350 directly mounted to one or more hubs 344. In a non-limiting example, the number of wheels may equal the number of hubs 344, which may be automatic locking hubs.

The tandem axle wheel hub assembly 300 also includes one or more clutch members 346 movable relative to the one or more hubs 344 and the tandem axle half shaft 324. The one or more clutch members 346 may be included in each of the wheel end disconnects 112 depicted in FIGS. 1 and 2 and may selectively connect (lock) and disconnect (unlock) the one or more hubs 344 and the one or more wheels 350 mounted thereon (and the tandem axle wheel hub assembly 300) with the tandem axle half shaft 324.

As a non-limiting example, an end 378 of the tandem axle half shaft 324 may be received within the one or more hubs 344. A drive gear 380 may be mounted on the end 378 of the tandem axle half shaft 324. The clutch member 346 may be engaged with the one or more hubs 344 and may be slidably moveable to selectively engage with the drive gear 380. When the clutch member 346 is engaged with the drive gear 380, the one or more hubs 344 may be coupled to the tandem axle half shaft 324. When the clutch member 346 is disengaged from the drive gear 380, the one or more hubs 344 may be disengaged from the tandem axle half shaft 324.

As shown in FIG. 3, the tandem axle wheel hub assembly 300 further includes one or more actuators 348. The one or more actuators 348 are selectively operable to induce axial movement of the one or more one or more hubs 344. The one or more actuators 348 are controlled by an electronic controller, such as the controller 12 introduced in FIG. 1. In some embodiments, the one or more actuators 348 are electric actuators, linear actuators, pneumatic actuators, hydraulic actuators, electro-mechanical actuators, and/or electro-magnetic actuators. For example, the one or more actuators 348 may engage the clutch member 346 with the drive gear 380, thus locking the one or more hubs 344 with the tandem axle half shaft 324, responsive to a first control signal from the controller, and the one or more actuators 348 may disengage the clutch member 346 from the drive gear 380, thus unlocking the one or more hubs 344 from the tandem axle half shaft 324, responsive to a second, different control signal from the controller.

Based on the foregoing, it can be appreciated that the tandem axle assembly 100 of FIG. 1 and the tandem axle assembly 200 of FIG. 2 can be operated in different modes. Therefore, FIG. 4 provides a method 400 that may be used to adjust operation of a tandem axle assembly of a vehicle, such as vehicle 5 of FIGS. 1 and 2, between a plurality of different operating modes while the vehicle is in motion. The tandem axle assembly may be the tandem axle assembly 100 of FIG. 1 or the tandem axle assembly 200 of FIG. 2, although method 400 may be applied in other systems including a tandem axle assembly that enables wheels to be selectively disconnected from a driveline. The tandem axle assembly may include one or more motor-generators driving rotation of one or more e-axles of the tandem axle assembly. Instructions for carrying out method 400 may be executed by a controller, such as controller 12 of FIGS. 1-3, based on instructions stored on a memory of the controller and in conjunction with signals received from sensors of the vehicle system, such as the sensors described with reference to FIG. 1. The controller may employ actuators of the vehicle system to adjust vehicle operation according to the methods described below, such as by adjusting an actuator of a wheel end disconnect to lock or unlock a corresponding hub to an axle.

At 402, method 400 includes estimating and/or measuring vehicle operating conditions. For example, a request for torque may be determined based on a pedal position sensor at an accelerator pedal of the vehicle, an engine and/or electric machine speed may be detected based on signals from Hall effect sensors arranged at an engine/electric machine, torque at the tandem axle assembly may be measured by torque load sensors, and speed at each of front axle shaft and rear axle shafts of the tandem axle assembly may be determined based on signals from speed sensors. Furthermore, a vehicle speed may be inferred based on the front and rear axle shaft speeds.

At 404, method 400 includes determining if an increase in traction is requested. For example, increased traction may be desired during startup and/or low-speed conditions of the vehicle (e.g., below 50 miles/hour). If increased traction is requested, e.g., by a change in accelerator pedal position and/or a user-initiated gear change, the method continues to 406 to operate the tandem axle assembly in a first mode. In an example of the first mode, each tandem axle wheel hub assembly may be connected to the corresponding tandem axle half shaft at 408. As a result, torque may be transmitted to one or more of the wheels. At 410, at least one e-axle of the tandem axle assembly is operated in a motor mode where the electric machine (e.g., a motor/generator) of the e-axle draws power from a battery, e.g., battery 158 of FIGS. 1 and 2, to provide vehicle propulsion. The method returns to the start.

Returning to 404, if increased traction is not requested, method 400 proceeds to 412 to confirm if operation of the vehicle in a coasting condition is requested. For example, the vehicle may reach a cruising speed (e.g., 50 miles/hour or greater) while traveling along a highway or may navigate a downhill slope. Coasting may be desired to reduce fuel consumption by relying on vehicle inertia to continue vehicle motion. However, depending on a battery state of charge (SOC), operating of the vehicle in a regeneration condition (as described further below) may be prioritized over the coasting condition. For example, if the battery SOC is below a threshold level, e.g., battery depletion is imminent, vehicle operation may be adjusted to the regeneration mode in spite of the vehicle reaching the cruising speed. If the coasting condition is requested and regeneration is not demanded, the method continues to 414 to operate the tandem axle assembly in a second mode.

In one example, operating the tandem axle assembly in the second mode may include disconnecting each wheel hub assembly from a corresponding axle half shaft at 416. For example, a first front tandem axle wheel assembly (e.g., 122 of FIGS. 1 and 2) may be disconnected from a first front tandem axle half shaft (e.g., 124 of FIGS. 1 and 2), a second front tandem axle wheel assembly (e.g., 128 of FIGS. 1 and 2) may be disconnected from a second front tandem axle half shaft (e.g., 126 of FIGS. 1 and 2), a first rear tandem axle wheel assembly (e.g., 138 of FIGS. 1 and 2) may be disconnected from a first rear tandem axle half shaft (e.g., 134 of FIGS. 1 and 2), and a second rear tandem axle wheel assembly (e.g., 140 of FIGS. 1 and 2) may be disconnected from a second rear tandem axle half shaft (e.g., 136 of FIGS. 1 and 2). In another example, only one wheel hub assembly may be disconnected from a front tandem axle assembly and/or only one wheel hub assembly may be disconnected from a rear tandem axle assembly of the tandem axle assembly. As a result, the one or more wheels coupled to each disconnected wheel hub assembly may rotate freely, thereby reducing drag.

Returning to 412, if the coasting condition is not requested, the method proceeds to 418 to determine if the regeneration condition, e.g., a third mode, is requested. The vehicle may be travelling at speed in between a speed range of the first mode and a speed range of the second mode. However, as described above, the vehicle may be travelling at the speed range of the second mode but may be operated in the third mode depending on the battery SOC. Operating the vehicle in the regeneration condition may be requested by actuation of a brake, as an example. The regeneration condition may include operating at least one motor/generator of the tandem axle assembly, where the motor/generator is configured to convert mechanical energy into electrical energy, as a generator. When operated as a generator, the motor/generator may harvest kinetic energy from the tandem axle assembly when a decrease in vehicle speed is desired. The harvested energy may be stored at the battery, thereby replenishing battery charge.

If the regeneration condition is requested or demanded based on the battery SOC, the method proceeds to 420 to operate the tandem axle assembly in the third mode. For example, the third mode may include, as described above, connecting each wheel hub assembly to its corresponding e-axle half shaft at 422. In one example, when the tandem axle assembly is configured as shown in FIG. 1, the wheel hub assemblies of the rear tandem axle wheel assembly may be connected. As another example, when the tandem axle assembly is configured as shown in FIG. 2, the wheel hub assemblies of at least one of the rear tandem axle wheel assembly and the front tandem axle wheel assembly may be connected. In some examples, the wheel hub assemblies of both the front and the rear tandem axle wheel assemblies may be connected. In other examples, the wheel hub assemblies one of the front or the rear tandem axle wheel assemblies may be connected and the wheel hub assemblies of the other axle wheel assembly may be unconnected when the SOC of the battery is above the threshold level and kinetic energy from one tandem axle wheel assembly is sufficient to fully replenish the charge.

Operating the tandem axle assembly in the third mode may optionally include disconnecting each wheel hub assembly from its corresponding conventional axle half shaft at 424 when the tandem axle assembly includes at least one conventional axle. The conventional axle half shaft may be an axle half shaft coupled to a differential driven by a prime mover of the vehicle, such as an engine. As an example, when the tandem axle assembly is configured as shown in FIG. 1, the first and second front wheel hub assemblies 122, 128 of the front tandem axle assembly 114 may be disconnected from the first and second front axle half shafts 124, 126, respectively. By disconnecting the wheel hub assembly of the conventional axle half shaft, the wheel(s) of the conventional axle half shaft may rotate freely. In this way the vehicle may be operated in both the coasting and the regeneration conditions. Deceleration of the vehicle may be enabled exclusively at the electrically powered wheel axle assemblies which may maximize an amount of regenerated energy.

For example, slowing of the vehicle may rely entirely on a braking operation executed at the e-axle(s), allowing maximum recuperation of kinetic energy. The tandem axle assembly may be operated in the third mode for a during of the braking operation, in one example and may be terminated when braking is deactivated, e.g., when the brake is released. In another example, the tandem axle assembly may be operated in the third mode until a battery SOC reaches a threshold level, e.g., full charge such as 100% charge, if the battery SOC reaches the threshold level before the braking operation ends. In some examples, the tandem axle assembly may be operated only when the braking operation lasts for a minimum threshold of time, such as 5 seconds or a minimum threshold braking force is applied.

At 426, method 400 includes operating the e-axles of the tandem axle assembly in a generator mode. Operating the e-axles in the generator mode may include utilizing rotation of the e-axle half-shafts to spin an armature of the e-axle motor/generator. Electrical energy is generated which may be stored at the battery. The method returns to the start.

Returning to 418, if the regeneration condition is not requested, the method continues to 428 to operate the tandem axle assembly in a fourth mode. When regeneration is not demanded, increased traction is not desired, and the vehicle is not coasting, variations in vehicle speed and torque output from the tandem axle assembly may be requested. For example, operating the tandem axle assembly in the fourth mode may include selecting one axle of the tandem axle assembly for driving vehicle propulsion at 430. By operating one axle, provided that the axle is able to meet the speed and torque output demand, an amount of energy consumed by vehicle propulsion may be reduced. The axle may be selected based on the requested torque, a torque output capacity of the axle, and efficiency considerations.

As one example, when the tandem axle assembly is configured as shown in FIG. 1, the front tandem axle wheel assembly (e.g., with a conventional axle) may provide a different torque output than the rear tandem axle wheel assembly (e.g., with an e-axle). The torque outputs at the axles relative to device speed (e.g., engine or motor/generator rpm) are depicted in FIG. 5 in graph 500. Therein, a first plot 502 shows a torque output of a motor/generator for an e-axle. Torque output is uniformly high at low speeds until a speed of the motor/generator reaches a first threshold 504. At the first threshold 504, a back-electromotive force (EMF) of the motor-generator increases to an extent to cause a decline in torque output of the motor/generator. At speeds beyond the first threshold 504, torque output of the motor/generator drops rapidly.

Graph 500 includes a second plot 506 which shows a torque output of an engine. The engine may have an optimal operating range at higher speeds than the maximum torque output of the motor-generator. Furthermore, the second plot 506 may have a parabolic shape, reaching a peak torque output 508 at a relatively high speed compared to the motor-generator. A region of overlap 510 between the first plot 502 and the second plot 506 is present between the first threshold 504 of the motor/generator and the maximum operating speed 512 of the engine. At speeds lower than an intersection 514 of the first plot 502 and the second plot 506, the motor/generator may generate more torque output than the engine. At speeds greater than the intersection 514, the engine produces more torque output than the motor/generator.

The different torque outputs of the engine and the motor/generator may be used to determine which axle is operated to drive vehicle propulsion. For example, at low vehicle speeds, e.g., vehicle speeds corresponding to device speeds lower than a minimum operating speed of the engine, the wheel hub assemblies of the e-axle may be connected and the motor/generator used to propel the vehicle. The wheel hub assemblies of the conventional axle may be disconnected. At vehicle speeds higher than the peak torque output 508 of the engine, the conventional axle may be used to propel the vehicle. The wheel hub assemblies may therefore be connected and the wheel hub assemblies of the e-axle may be disconnected.

When vehicle speeds corresponding to a portion of the region of overlap 510 between the first threshold 504 of the motor/generator and the peak torque output 508 of the engine are requested, axle selection may depend on various vehicle conditions. As one example, the requested vehicle speed may be within a portion of the region of overlap 510 where the torque output from the motor/generator is greater than the torque output from the engine. However, if the battery SOC is low, it may be desirable to use the engine to power vehicle propulsion to mitigate further depletion of the battery even if the speed is in a region where torque output from the motor/generator is greater than torque output from the engine. In addition, if activation of other vehicle operations that draw power from the battery, such as powering auxiliary devices, is requested, electrical power may be directed to the vehicle operations and vehicle propulsion may be exclusively driven by the conventional axle. In some examples, the controller may prioritize certain battery-powered vehicle operations over meeting torque demand and command disconnecting of the wheel hub assemblies at the e-axle even if the engine torque output falls short of the torque demand.

Furthermore, when requested vehicle speeds correspond to a portion of the region of overlap 510 between the intersection 514 and the maximum operating speed 512 of the engine, the engine may provide greater torque output than the motor/generator. However, in some instances, vehicle propulsion may be provided exclusively by the e-axle in spite of the lower available torque output. For example, a fuel level in a fuel tank of the vehicle may fall below a threshold level and refueling of the tank may be demanded. To conserve fuel, the wheel hub assemblies of the conventional axle may be disconnected and the e-axle may be used to drive vehicle propulsion even though the torque output of the motor/generator is less than the torque output of the e-axle. In yet other examples, even if the fuel level is above the threshold level, exclusive propulsion by the e-axle may be selected to increase a fuel economy of the vehicle, particularly if the e-axle is able to meet the torque demand and the SOC of the battery is high.

During a drive cycle with variable torque demand, torque supply may alternate between the conventional axle and the e-axle depending on a balance between accommodating vehicle operating conditions and fuel efficiency, as described above. Furthermore, when the tandem axle assembly is configured as shown in FIG. 2, the e-axles (e.g., a front e-axle of the front tandem wheel axle assembly and a rear e-axle of the rear tandem wheel axle assembly) may be powered either by a common battery or independently powered by separate batteries. A first motor/generator of the front e-axle may be equivalent in torque output to a second motor/generator of the rear e-axle. When single axle drive is requested, vehicle propulsion may be propelled similarly by either the first motor/generator or the second motor/generator.

However, use of the e-axles may alternate between the front e-axle and the rear e-axle depending on efficiency conditions at the motor/generators. For example, the front e-axle may be activated to drive vehicle propulsion. As the corresponding first motor/generator operates, heat is generated which may be extracted by a cooling system such as the cooling system 170 of FIGS. 1 and 2. However, the temperature of the first motor/generator may eventually rise until the temperature reaches a first threshold temperature, above which a performance of the first motor/generator is degraded. Cooling of the first motor/generator may continue but the first motor/generator may be activated and propulsion of the vehicle may be switched to the rear e-axle. In some examples, during initial operation of the rear e-axle, coolant flow may be entirely directed to the deactivated first motor/generator to rapidly decrease the temperature to a second threshold temperature that is lower than the first threshold temperature. When the temperature of the first motor/generator is reduced to the second threshold temperature, coolant may be directed to both the first and the second motor/generator. Alternatively, the coolant may be entirely delivered to the active second motor/generator to maximize cooling depending on a torque demand. It will be appreciated that in other examples, the second motor/generator may be operated first followed by operation of the first motor/generator once the second motor/generator temperature reaches the first threshold temperature.

Returning to FIG. 4, operating the tandem axle assembly in the fourth mode may also include connecting the wheel hub assemblies of the half shafts of the selected axle and disconnecting the wheel hub assemblies from the half shafts of the other, non-selected axle at 432. At 434, method 400 includes operating the motor/generator of the selected axle, e.g., when the selected axle is an e-axle, in the motor mode. In the motor mode, the motor/generator draws energy from the battery to convert electrical energy into mechanical energy and power rotation of the motor. However, if the selected axle is a conventional axle, 432 may be omitted. The method returns to the start.

In this way, operation of a tandem axle assembly may enable a fuel economy of a vehicle to be at least maintained. The tandem axle assembly may include wheel hub assemblies that enable locking and unlocking of wheels to axle half shafts. When locked, torque from a torque-generating device of the tandem axle assembly is transmitted to the wheels, thereby driving vehicle propulsion. When unlocked, the wheels may be disengaged from the torque-generating device and allowed to rotate freely. Adjustment of the wheel hub assemblies may be conducted while the vehicle is in motion, enabling operation of the tandem axle assembly in different modes according to desired vehicle operation such as increased traction, coasting, and energy regeneration. Furthermore, varying operation between providing torque at two axles versus one axle of the tandem axle assembly may be executed in response to vehicle speed and operating conditions, thereby maintaining and/or increasing a fuel efficiency of the vehicle. As such, operation of the tandem axle assembly is enabled without imposing additional complexity and costs.

The technical effect of adjusting operation of the tandem axle assembly as described herein is that the torque output at the axles is adjusted based on vehicle operating conditions. As a result, fuel efficiency may be optimized and a useful life of torque-generating devices, such as electric motor/generators, may be prolonged.

The disclosure also provides support for a method for controlling a multi-axle assembly in a vehicle, comprising: operating the multi-axle assembly according to a requested mode of a plurality of modes, wherein the plurality of modes includes providing torque at one, two and no axles of the multi-axle assembly based on a speed of the vehicle. In a first example of the method, providing torque at an axle of the multi-axle assembly includes connecting wheels to the axle to propel vehicle motion and wherein the wheels are connected to the axle by wheel hub assemblies configured to lock and unlock the wheels to and from the axle. In a second example of the method, optionally including the first example, operating the multi-axle assembly according to the requested mode includes operating the multi-axle assembly in a first mode of the plurality of modes and wherein the first mode includes connecting wheels to two axles of the multi-axle assembly. In a third example of the method, optionally including the first and second examples, operating the multi-axle assembly in the first mode includes propelling the vehicle at one of a low vehicle speed or vehicle startup. In a fourth example of the method, optionally including the first through third examples, operating the multi-axle assembly according to the requested mode includes operating the multi-axle assembly in a second mode of the plurality of modes and wherein the second mode includes disconnecting wheels from two axles of the multi-axle assembly. In a fifth example of the method, optionally including the first through fourth examples, operating the multi-axle assembly in the second mode includes propelling the vehicle at a high vehicle speed. In a sixth example of the method, optionally including the first through fifth examples, operating the multi-axle assembly according to the requested mode includes operating the multi-axle assembly in a third mode of the plurality of modes and wherein the third mode includes connecting wheels at one or more electrically driven axles and disconnecting wheels at an engine driven axle of the multi-axle assembly. In a seventh example of the method, optionally including the first through sixth examples, operating the multi-axle assembly in the third mode includes operating one or more electric machines in a generator mode, each of the one or more electric machines driving rotation of an electrically driven axle of the one or more electrically driven axles. In an eighth example of the method, optionally including the first through seventh examples, operating the multi-axle assembly according to the requested mode includes operating the multi-axle assembly in a fourth mode of the plurality of modes and wherein the fourth mode includes selecting one axle to provide vehicle propulsion by connecting wheels to the selected one axle and disconnecting wheels at another axle of the multi-axle assembly. In a ninth example of the method, optionally including the first through eighth examples, selecting the one axle to provide vehicle propulsion includes selecting the one axle based on a matching of a desired vehicle speed to a torque output of the one axle at the desired vehicle speed when the multi-axle assembly includes one electrically driven axle and one engine driven axle. In a tenth example of the method, optionally including the first through ninth examples, selecting the one axle to provide vehicle propulsion includes selecting the one axle based on a temperature of an electric machine driving rotation of the one axle when the multi-axle assembly includes two electrically driven axles and wherein a first electric machine of a first axle of the two electrically driven axles is selected when a temperature of the first electric machine is below a threshold temperature and a temperature of a second electric machine of a second axle of the two electrically driven axles is above the threshold temperature. In an eleventh example of the method, optionally including the first through tenth examples, operating the multi-axle assembly according to a requested mode of a plurality of modes further includes providing torque at a third axle of the multi-axle assembly based on the speed of the vehicle.

The disclosure also provides support for a method for a tandem axle assembly in a vehicle, comprising: responsive to a low speed condition of the vehicle, supplying torque at a first set of wheels and a second set of wheels of the vehicle by connecting the first set of wheels to a first axle and the second set of wheels to a second axle of the tandem axle assembly, responsive to a high speed condition of the vehicle, disconnecting the first set of wheels from the first axle and the second set of wheels from the second axle to interrupt torque supply to first and second sets of wheels, and responsive to a variable speed condition of the vehicle, selectively connecting one of the first set of wheels to the first axle and the second set of wheels to the second axle according to vehicle operating conditions. In a first example of the method, the method further comprises: responsive to the variable speed condition of the vehicle, connecting the first set of wheels to the first axle and the second set of wheels to the second axle when the first axle and the second axle are both electrically driven by a motor/generator, connecting the first set of wheels to the first axle and disconnecting the second set of wheels to the second axle when the first axle is electrically driven by the motor/generator and the second axle is engine driven, and operating each motor/generator in a generator mode. In a second example of the method, optionally including the first example, selectively connecting one of the first set of wheels to the first axle and the second set of wheels to the second axle includes connecting the first set of wheels to the first axle when the first axle is electrically driven by a motor/generator and the second axle is engine driven and when a speed of the vehicle is below a threshold speed of the motor/generator. In a third example of the method, optionally including the first and second examples, the threshold speed of the motor/generator is a speed below which a torque output of the motor/generator is at a maximum and wherein the first set of wheels are disconnected from the first axle and the second set of wheels are connected to the second axle when the speed of the vehicle increases above the threshold speed of the motor/generator. In a fourth example of the method, optionally including the first through third examples, selectively connecting one of the first set of wheels to the first axle and the second set of wheels to the second axle includes connecting the first set of wheels to the first axle and propelling the vehicle by the first axle until a temperature of a first electric machine configured to drive rotation of the first axle reaches a threshold temperature when the first axle and the second axle are both electrically driven, the threshold temperature being a temperature above which a torque output of the first electric machine is degraded and wherein the first set of wheels is disconnected from the first axle and the second set of wheels is connected to the second axle when the temperature of the first electric machine reaches the threshold temperature. In a fifth example of the method, optionally including the first through fourth examples, selectively connecting one of the first set of wheels to the first axle and the second set of wheels to the second axle includes connecting the second set of wheels to the second axle and propelling the vehicle by the second axle until a temperature of a second electric machine configured to drive rotation of the second axle reaches the threshold temperature and wherein the second set of wheels is disconnected from the second axle and the first set of wheels is connected to the first axle when the temperature of the second electric machine reaches the threshold temperature.

The disclosure also provides support for a tandem axle assembly for a vehicle, comprising: a first axle coupled to a first torque-generating device, the first axle configured to be connected to a first set of wheels, a second axle arranged parallel with and adjacent to the first axle, the second axle coupled to a second torque-generating device and configured to be connected to a second set of wheels, and a controller with computer readable instructions stored on non-transitory memory that, when executed during vehicle operation, cause the controller to: adjust torque supply at the first and second sets of wheels in response to vehicle operating conditions, wherein the torque is supplied at one, both or neither of the first and second sets of wheels. In a first example of the system, the first torque-generating device is one of an engine-driven differential and a first electric machine and the second torque-generating device is a second electric machine.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for controlling a multi-axle assembly in a vehicle, comprising:
   in a first mode, operating a first disconnect in a first axle assembly to decouple a first wheel from a prime mover; and
   operating a second disconnect in the first axle assembly to decouple a second wheel from the prime mover;
   wherein the multi-axle assembly includes:
      the first axle assembly driven by the prime mover; and
      a second axle assembly driven by an electric machine.

2. The method of claim 1, wherein the first mode is a coasting mode and the method further comprises, in the coasting mode:
   operating a third disconnect, in the second axle assembly, to decouple a third wheel from the electric machine; and
   operating a fourth disconnect, in the second axle assembly, to decouple a fourth wheel from the electric machine.

3. The method of claim 1, wherein the first mode is a regeneration mode, the electric machine is a motor-generator, and the method further comprises, in the regeneration mode:
   operating a third disconnect, in the second axle assembly, to couple a third wheel and the electric machine;
   operating a fourth disconnect, in the second axle assembly, to couple a fourth wheel and the electric machine; and
   operating the motor-generator to generate electrical power.

4. The method of claim 1, wherein the first disconnect and the second disconnect are included in a first wheel hub assembly and a second wheel hub assembly, respectively.

5. The method of claim 1, further comprising:
   in an increased traction mode, operating the first disconnect to couple the first wheel and the prime mover;
   operating the second disconnect to couple the second wheel and the prime mover;
   operating a third disconnect, in the second axle assembly, to couple a third wheel and the electric machine; and
   operating a fourth disconnect, in the second axle assembly, to couple a fourth wheel and the electric machine.

6. The method of claim 1, wherein the multi-axle assembly is a tandem axle assembly.

7. The method of claim 1, wherein the vehicle is an electric vehicle.

8. A multi-axle system, comprising:
   a first axle assembly driven by a prime mover and including a first disconnect and a second disconnect;
   a second axle assembly driven by a first electric machine and including a third disconnect and a fourth disconnect; and
   a controller with instructions stored on non-transitory memory that, when executed during a first mode, cause the controller to:
      operate the first disconnect to decouple a first wheel from the prime mover; and
      operate the second disconnect to decouple a second wheel from the prime mover.

9. The multi-axle system of claim 8, wherein the prime mover is an engine.

10. The multi-axle system of claim 8, wherein the prime mover is a second electric machine.

11. The multi-axle system of claim 8, wherein the multi-axle system is a tandem axle system.

12. The multi-axle system of claim 8, wherein the first mode is a coasting mode and the controller further includes instructions stored on the non-transitory memory that when executed during the coasting mode, cause the controller to:
   operate the third disconnect to decouple a third wheel from the first electric machine; and
   operate the fourth disconnect to decouple a fourth wheel from the first electric machine.

13. The multi-axle system of claim 8, wherein the first mode is a regeneration mode, the first electric machine is a motor-generator, and the controller further includes instructions stored on the non-transitory memory that when executed during the regeneration mode, cause the controller to:

operate the third disconnect to couple a third wheel to the first electric machine;
operate the fourth disconnect to couple a fourth wheel to the first electric machine; and
operate the motor-generator to generate electrical power.

14. The multi-axle system of claim 8, wherein the controller further includes instructions stored on the non-transitory memory that when executed during an increased traction mode, cause the controller to:
operate the first disconnect to couple the first wheel and the prime mover;
operate the second disconnect to couple the second wheel and the prime mover;
operate the third disconnect to couple a third wheel to the first electric machine; and
operate the fourth disconnect to couple a fourth wheel to the first electric machine.

15. A method for controlling a tandem-axle assembly in an electric vehicle, comprising:
in a first mode, operating a first disconnect, in a first axle assembly, to decouple a first wheel from a prime mover; and
operating a second disconnect, in the first axle assembly, to decouple a second wheel from the prime mover;
wherein the tandem-axle assembly includes:
the first axle assembly driven by an engine; and
a second axle assembly driven by a motor-generator.

16. The method of claim 15, wherein the first disconnect and the second disconnect are included in a first wheel hub assembly and a second wheel hub assembly, respectively.

17. The method of claim 15, wherein the first mode is a coasting mode or a regeneration mode.

18. The method of claim 15, further comprising, in the first mode:
operating a third disconnect, in the second axle assembly, to decouple a third wheel from the motor-generator; and
operating a fourth disconnect, in the second axle assembly, to decouple a fourth wheel from the motor-generator.

19. The method of claim 15, further comprising, in a second mode:
operating the first disconnect to couple the first wheel and the engine;
operating the second disconnect to couple the second wheel and the engine;
operating a third disconnect, in the second axle assembly, to couple a third wheel to the motor-generator; and
operating a fourth disconnect, in the second axle assembly, to couple a fourth wheel to the motor-generator.

20. The method of claim 15, wherein the first mode is a lower speed or startup mode.

* * * * *